(12) United States Patent
Lee et al.

(10) Patent No.: US 8,788,607 B2
(45) Date of Patent: Jul. 22, 2014

(54) QUEUING SYSTEM AND METHOD

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 109 days.

(21) Appl. No.: 13/316,490

(22) Filed: Dec. 10, 2011

(65) Prior Publication Data

US 2012/0221665 A1  Aug. 30, 2012

(30) Foreign Application Priority Data

Feb. 24, 2011  (TW) .............................. 100106263 A

(51) Int. Cl.
*G06F 15/16* (2006.01)

(52) U.S. Cl.
USPC .......................................... 709/207; 709/200

(58) Field of Classification Search
USPC .................................................. 709/200, 207
See application file for complete search history.

(56) References Cited

U.S. PATENT DOCUMENTS

| | | | |
|---|---|---|---|
| 5,502,806 A * | 3/1996 | Mahoney et al. .............. 715/839 |
| 6,173,209 B1 * | 1/2001 | Laval et al. ...................... 700/91 |
| 7,069,228 B1 * | 6/2006 | Rose et al. ........................ 705/5 |
| 7,672,897 B2 * | 3/2010 | Chung et al. .................... 705/37 |
| 7,752,146 B2 * | 7/2010 | Lert, Jr. ......................... 705/500 |
| 7,787,965 B2 * | 8/2010 | Hale et al. ....................... 700/17 |
| 7,895,066 B2 * | 2/2011 | Waytena et al. .................. 705/5 |
| 8,027,847 B1 * | 9/2011 | Francis et al. .................... 705/2 |
| 8,095,400 B2 * | 1/2012 | Herde et al. ..................... 705/5 |
| 8,397,989 B2 * | 3/2013 | Wengrovitz ................. 235/384 |
| 2002/0055863 A1 * | 5/2002 | Behaylo .......................... 705/5 |
| 2002/0082879 A1 * | 6/2002 | Miller et al. ..................... 705/5 |
| 2002/0116235 A1 * | 8/2002 | Grimm et al. ................... 705/5 |
| 2004/0060982 A1 * | 4/2004 | Zenou ......................... 235/383 |
| 2004/0158482 A1 * | 8/2004 | Hale et al. ....................... 705/5 |
| 2005/0075945 A1 * | 4/2005 | Hodge et al. ................... 705/26 |
| 2008/0040172 A1 * | 2/2008 | Watkins .......................... 705/7 |
| 2009/0154759 A1 * | 6/2009 | Koskinen et al. ............ 382/100 |
| 2010/0102117 A1 * | 4/2010 | Regensburger et al. ...... 235/375 |
| 2011/0062231 A1 * | 3/2011 | Wang ........................... 235/379 |
| 2011/0227697 A1 * | 9/2011 | Spencer et al. ............... 340/5.6 |
| 2011/0258058 A1 * | 10/2011 | Carroll et al. .................. 705/15 |

(Continued)

OTHER PUBLICATIONS

WO 2010/020493.*

(Continued)

*Primary Examiner* — Anthony Mejia
(74) *Attorney, Agent, or Firm* — Novak Druce Connolly Bove + Quigg LLP

(57) ABSTRACT

A portable electronic device includes a queuing system. An agent server provided by a service provider assigns a queue number to a user of the portable electronic device, generates a mobile barcode according to the queue number and a uniform resource locator (URL) of the service provider, and displays the 2D mobile barcode on an electronic display. The queuing system 20 decodes the 2D mobile barcode captured by a camera to obtain the queue number and the URL, uses the URL to log into the agent server 2, and sends user information to the agent server. The agent server records the user information and monitors business processing status of one or more client computers connected to the agent server, generates an alert message based on the business processing status, and sends the alert message to the portable electronic device ahead of time according to the recorded user information.

12 Claims, 5 Drawing Sheets

(56) References Cited

U.S. PATENT DOCUMENTS

| | | | |
|---|---|---|---|
| 2012/0089425 A1* | 4/2012 | Borucki | 705/5 |
| 2012/0158482 A1* | 6/2012 | Paradise et al. | 705/14.25 |
| 2012/0295591 A1* | 11/2012 | Boudville | 455/414.1 |
| 2013/0026217 A1* | 1/2013 | Boudville | 235/375 |
| 2013/0054282 A1* | 2/2013 | Pinkus et al. | 705/5 |
| 2013/0059603 A1* | 3/2013 | Guenec et al. | 455/456.2 |
| 2013/0066667 A1* | 3/2013 | Gulec et al. | 705/7.13 |
| 2013/0090957 A1* | 4/2013 | Popkey et al. | 705/5 |
| 2013/0111208 A1* | 5/2013 | Sabin et al. | 713/171 |
| 2013/0144734 A1* | 6/2013 | Perkins et al. | 705/18 |

OTHER PUBLICATIONS

51/4451 provisional application specification.*

* cited by examiner

QUEUING SYSTEM AND METHOD

BACKGROUND

1. Technical Field

The embodiments of the present disclosure relate to data processing technology, and particularly to an image processing apparatus and method.

2. Description of Related Art

Queue machines are widely used in many places, such as banks, hospitals, post offices, for example. When customers press a button of a queue machine, the queue machine automatically prints tickets with orderly queue numbers. Then the customers stay at a waiting area and wait for their queue numbers to be called for service. One problem of the aforementioned queuing mode is that, if a customer leaves the waiting area or even stays in the waiting area but ignores the called queue number for other reasons, such as surfing on the Internet or communicating via a mobile phone, the queue number will be canceled and the customer has to queue again.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
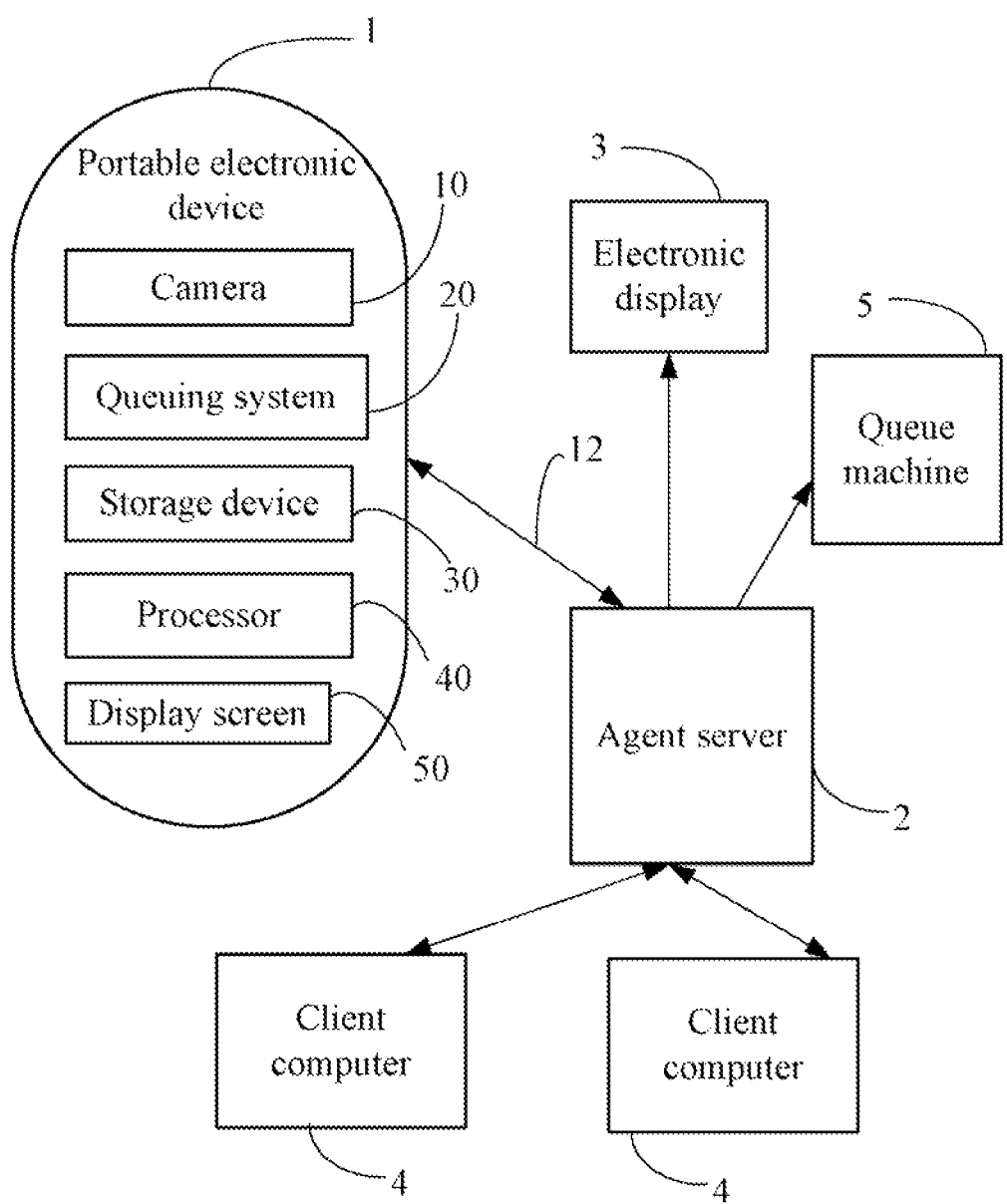
FIG. 1 is one embodiment of an application environment of a queuing system.

FIG. 1 is a step diagram of one embodiment of an application environment of a queuing system 20. In one embodiment, the queuing system 20 is installed within a portable electronic device 1. The portable electronic device 1 further includes a camera 10, a storage device 30, a processor 40, and a display screen 50. The portable electronic device 1 may be connected to an agent server 2 via a network 12. The network 12 may be a global system for mobile communications (GSM), a general packet radio service (GPRS) network, or any other suitable network. A service provider, such as a bank, a hospital, or a government organization, provides the agent server 2, which is connected to an electronic display 3, for example. The agent server 2 is further connected to a plurality of client computers 4, which is also provided by the service provider for employees of the service provider to service the customers.

In one embodiment, the portable electronic device 1 may be a mobile phone, a portable computer, for example. When a user of the portable electronic device 1 goes to a service place of the service provider, the agent server 2 assigns a queue number to the user in response to the user sending a request for service. For example, the user may press a button of a queue machine 5 to send the request to the agent server 2. The agent server 2 generates a two-dimensional (2D) mobile barcode according to the queue number and a uniform resource locator (URL) of the service provider, and displays the 2D mobile barcode on the electronic display 3. The user uses the camera 10 to capture an image of the 2D mobile barcode. The queuing system 20 decodes the 2D mobile barcode to obtain the queue number and the URL, uses the URL to log into the agent server 2, and sends user information, such as a name, a phone number, and a queue number of the user, to the agent server 2. The agent server 2 records the user information, monitors business processing statuses of the client computers 4, and sends alert messages to the portable electronic device 1 ahead of time, to inform the user to prepare to go to the client computers 4 for service.

Figure 2:
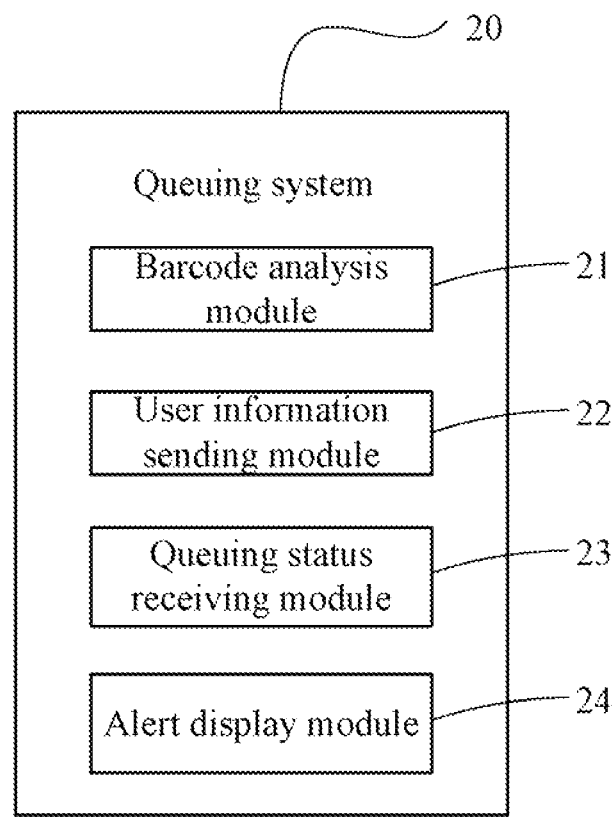
FIG. 2 is one embodiment of function modules of the queuing system in FIG. 1.
Figure 3:
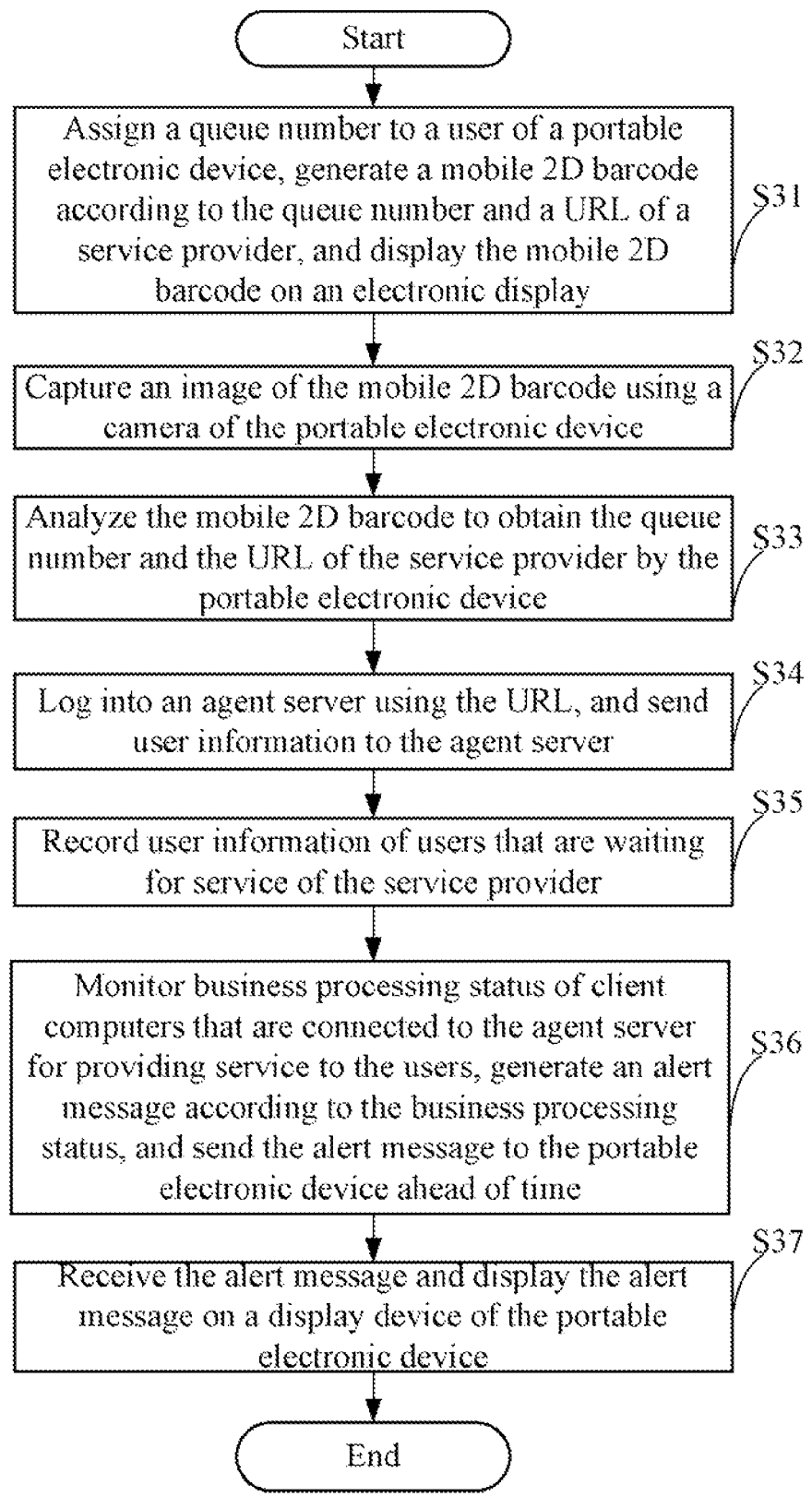
FIG. 3 is a flowchart of one embodiment of a queuing method.

As shown in FIG. 2, the queuing system 20 includes a barcode analysis module 21, a user information sending module 22, and a queuing status receiving module 23, and an alert display module 24. The modules 21-24 may include computerized code in the form of one or more programs that are stored in the storage device 30. The computerized code includes instructions to be processed by the processor 40 to provide the aforementioned functions of the queuing system 20. A detailed description of the functions of the modules 21-24 are illustrated in FIG. 3. The storage device 30 may be a cache or a dedicated memory, such as an EPROM, HDD, or flash memory.

FIG. 3 is a flowchart of one embodiment of a queuing method. Depending on the embodiment, additional steps may be added, others removed, and the ordering of the steps may be changed.

In step S31, the agent server 2 assigns a queue number to the user of the portable electronic device 1 in response to a button of the queue machine 5 being pressed by the user. The agent server 2 generates a 2D mobile barcode according to the queue number and a URL of a service provider (e.g., a bank), and displays the 2D mobile barcode on the electronic display 3. The 2D mobile barcode includes, but not limited to, PDF417, Code 49, Code 16K, Code one, Aztec Code, DataMatrix, and QR.

In step S32, the user uses the camera 10 to capture an image of the 2D mobile barcode.

In step S33, the barcode analysis module 21 decodes the 2D mobile barcode to obtain the queue number and the URL. For example, the queue number may be "143", and the URL may be "http://www.sdb.com.cn".

In step S34, the user information sending module 22 sends user information, such as a name, a phone number, and the queue number of the user, to the agent server 2.

Figure 4:
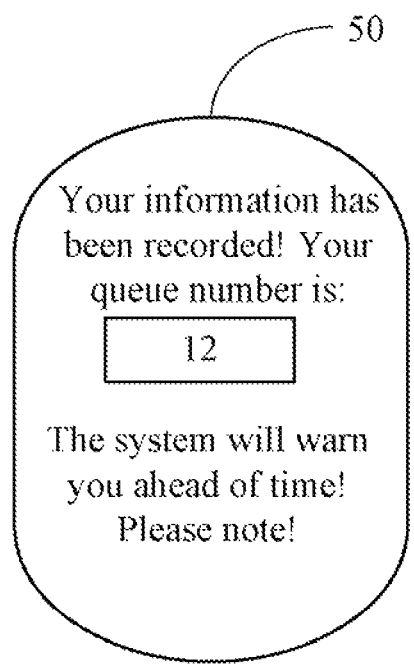
FIG. 4 and FIG. 5 illustrate queuing information displayable on a display device of a portable electronic device in which the queuing system is installed.

In step S35, the agent server 2 records user information of users that are waiting for service of the service provider. For example, the record information may be in the form of "user A: queue number/123; name/Scot; phone number/134**"; user B: queue number/124; name/Mia; phone number/135***; . . . ". The agent server 2 further sends back queue information of each user to the corresponding portable electronic device 1 using the URL or short messages according to the phone number of the user, then the alert display module 24 displays the queue information on the display screen 50 of the corresponding portable electronic device. For example, as shown in FIG. 4, the queue information displayed on the display screen 50 is as follows: "Your information has been recorded! Your queue number is: 12. The system will warn you ahead of time! Please note!"

In step S36, the agent server 2 monitors business processing status of the client computers 4 that provide service, such as queue numbers of the users that are being serviced by employees who operate the client computers 4. The agent server 2 further generates alert messages according to the business processing status to inform users with corresponding queue numbers that are waiting for service ahead of time, and sends the alert messages to the portable electronic devices 10 having the corresponding queue numbers. For example, if there are eight client computers 40 providing service, eight users can be serviced at the same time, then the agent server 2 may generate alert messages for next sixteen users to inform the next sixteen eight users to prepare to go to the client computers 40 for service.

Figure 5:
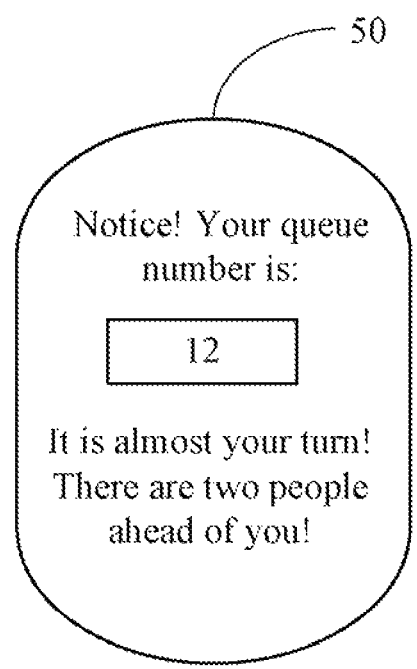

In step S37, the queue status receiving module 23 receives the alert message, and the alert display module 24 displays the alert message on the display screen 50. For example, as shown in FIG. 5, the portable electronic device 1 of the user that has been assigned the queue number 12 may receive and display the alert message "Notice! Your queue number is: 12. It is almost your turn! There are two people ahead of you!"

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A queuing method being performed by execution of instructions by a processor of a portable electronic device, the method comprising:

using a camera of the portable electronic device to capture an image of a two-dimensional (2D) mobile barcode displayed on an electronic display provided by a service provider, and decoding the 2D mobile barcode by the portable electronic device to obtain a queue number assigned by an agent server to a user of the portable electronic device and a uniform resource locator (URL) of the service provider;

logging into the agent server using the URL, and sending user information to the agent server, wherein the user information comprises a phone number of the portable electronic device and the queue number of the user;

receiving an alert message for informing the user to prepare to go to a client computer provided by the service provider for service, and displaying the alert message on a display screen of the portable electronic device; and wherein the agent server monitors business processing status of one or more client computers that are connected to the agent server for providing service, generates the alert message according to the business processing status, to inform users with corresponding queue numbers that are waiting for service ahead of time, and sends the alert message to the portable electronic device having the corresponding queue numbers ahead of time.

2. The method of claim 1, wherein the queue number is assigned by the agent server in response to a button of a queue machine connected to the agent server being pressed by the user, and the 2D mobile barcode is generated based on the queue number and the URL of the service provider and displayed on the electronic display connected to the agent server.

3. The method of claim 2, wherein the agent server records user information of users that are waiting for service of the service provider, and sends back queue information of each user to a corresponding portable electronic device according to the phone number of the corresponding portable electronic device.

4. The method of claim 1, wherein the business processing statuses comprise queue numbers of users that are being serviced by employees who operate the one or more client computers.

5. A non-transitory medium storing a set of instructions, the set of instructions capable of being executed by a processor of a portable electronic device to perform a queue method, the method comprising:

using a camera of the portable electronic device to capture an image of a two-dimensional (2D) mobile barcode displayed on an electronic display provided by a service provider, and decoding the 2D mobile barcode by the portable electronic device to obtain a queue number assigned by an agent server to a user of the portable electronic device and a uniform resource locator (URL) of the service provider;

logging into the agent server using the URL, and sending user information to the agent server, wherein the user information comprises a phone number of the portable electronic device and the queue number of the user;

receiving an alert message for informing the user to prepare to go to a client computer provided by the service provider for service, and displaying the alert message on a display screen of the portable electronic device; and wherein the agent server monitors business processing status of one or more client computers that are connected to the agent server for providing service, generates the alert message according to the business processing status, to inform users with corresponding queue numbers that are waiting for service ahead of time, and sends the alert message to the portable electronic device having the corresponding queue numbers ahead of time.

6. The medium of claim 1, wherein the queue number is assigned by the agent server in response to a button of a queue machine connected to the agent server being pressed by the user, and the 2D mobile barcode is generated based on the queue number and the URL, of the service provider and displayed on the electronic display connected to the agent server.

7. The medium of claim 6, wherein the agent server records user information of users that are waiting for service of the service provider, and sends back queue information of each user to a corresponding portable electronic device according to the phone number of the corresponding portable electronic device.

8. The medium of claim 5, wherein the business processing statuses comprise queue numbers of users that are being serviced by employees who operate the one or more client computers.

9. A portable electronic device, comprising:
   a camera;
   a storage device;
   a processor; and
   one or more programs stored in the storage device and being executable by the processor, the one or more programs comprising instructions:
   to decode a two-dimensional (2D) mobile barcode captured by the camera from an electronic display provided by a service provider, to obtain a queue number assigned by an agent server to a user of the portable electronic device and a uniform resource locator (URL) of the service provider;
to log into the agent server using the URL, and send user information to the agent server, wherein the user information comprises a phone number of the portable electronic device and the queue number of the user;
to receive an alert message for informing the user to prepare to go to a client computer provided by the service provider for service, and display the alert message on a display screen of the portable electronic device; and
wherein the agent server monitors business processing status of one or more client computers that are connected to the agent server for providing service, generates the alert message according to the business processing status, to inform users with corresponding queue numbers that are waiting for service ahead of time and sends the alert message to the portable electronic device having the corresponding queue numbers ahead of time.

10. The device of claim 9, wherein the queue number is assigned by the agent server in response to a button of a machine connected to the agent server being pressed by the user, and the 2D mobile barcode is generated based on the queue number and the URL of the service provider and displayed on the electronic display connected to the agent server.

11. The device of claim 10, Wherein the agent server records user information of users that are waiting for service of the service provider, and sends back queue information of each user to a corresponding portable electronic device according to the phone number of the corresponding portable electronic device.

12. The device of claim 9, wherein the business processing statuses comprise queue numbers of users that are being serviced by employees who operate the one or more client computers.

* * * * *